United States Patent [19]

Cohen

[11] Patent Number: 4,466,596

[45] Date of Patent: Aug. 21, 1984

[54] INSTRUMENT ACCESSORY CLAMPING DEVICE

[75] Inventor: Martin B. Cohen, Hillsdale, N.J.

[73] Assignee: Latin Percussion, Inc., Garfield, N.J.

[21] Appl. No.: 250,802

[22] Filed: Apr. 3, 1981

[51] Int. Cl.³ .............................................. F16M 13/00
[52] U.S. Cl. .................................... 248/635; 248/454; 248/231.4; 248/447.1
[58] Field of Search ................ 248/635, 316 A, 312.1, 248/443, 441.1, 441 C, 226.1; 403/365, 362, 354

[56] References Cited

U.S. PATENT DOCUMENTS

| | | | |
|---|---|---|---|
| 369,971 | 9/1887 | Stillman | 248/316 A X |
| 376,593 | 1/1888 | Greenwalt et al. | 248/447.4 X |
| 758,924 | 5/1904 | Law | 248/447.4 X |
| 1,026,506 | 5/1912 | Hard | 248/447.4 X |
| 1,482,308 | 1/1924 | Lieberenz | 248/226.1 X |
| 1,494,212 | 5/1924 | Bromley | 248/447.4 X |
| 2,129,933 | 9/1938 | Hueglin | 248/635 X |

FOREIGN PATENT DOCUMENTS 562865 10/1932 Fed. Rep. of Germany ... 248/226.1

Primary Examiner—Ramon S. Britts
Assistant Examiner—Sarah A. Lechok
Attorney, Agent, or Firm—Collard, Roe & Galgano

[57] ABSTRACT

A clamping device for releasably mounting an instrument accessory includes a clamp member having an elongated channel formed therein, a worm shaft rotatably retained in the channel, a control device for rotating the worm shaft, a movable clamping jaw received on the shaft for reciprocal movement along the channel upon rotation of the shaft, and a fixed clamping jaw disposed adjacent to one end of the channel for cooperation with the movable clamping jaw. A support arm for supporting an instrument accessory is also provided which is mounted on the clamp member in a substantially universally-adjustable manner. The clamping device is especially intended for releasably mounting microphones and percussion accessories on the rims of drums.

4 Claims, 8 Drawing Figures

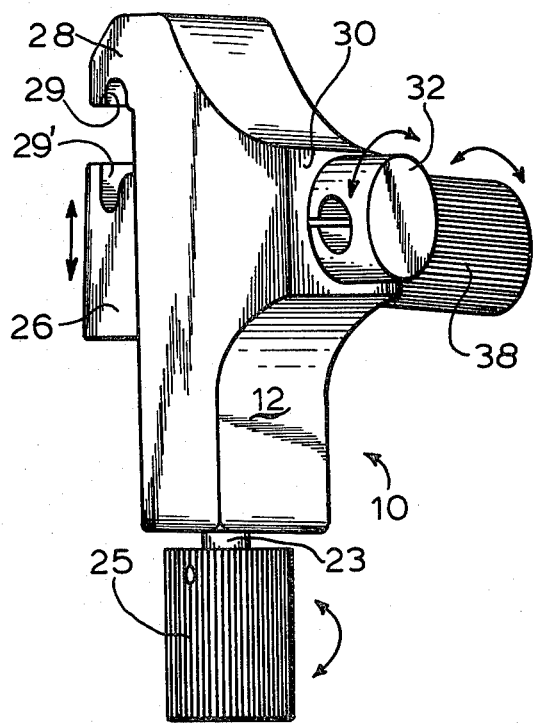
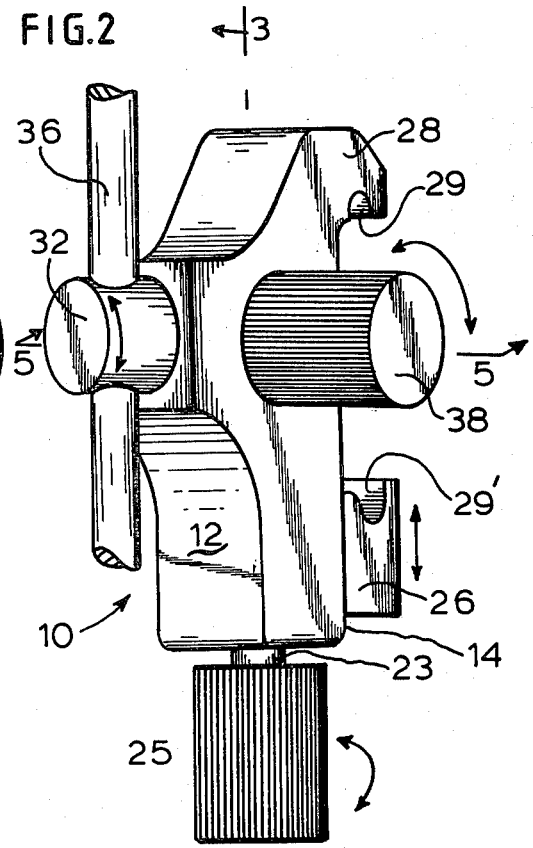
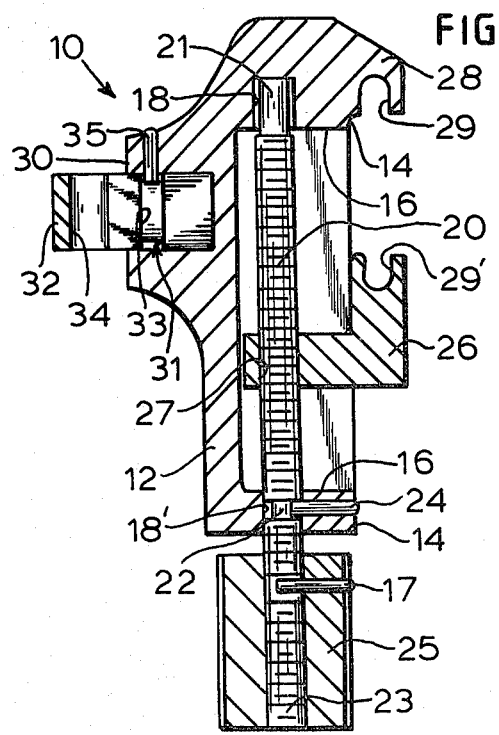
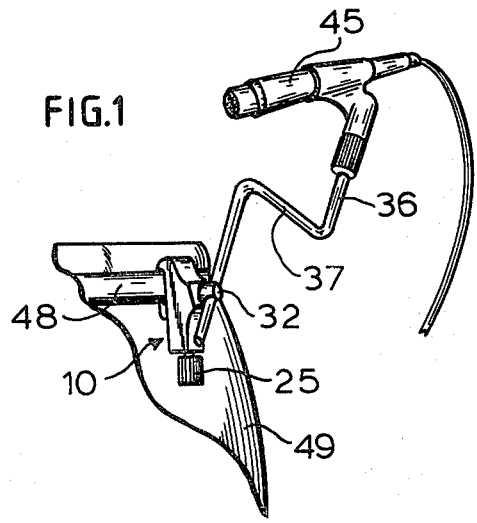

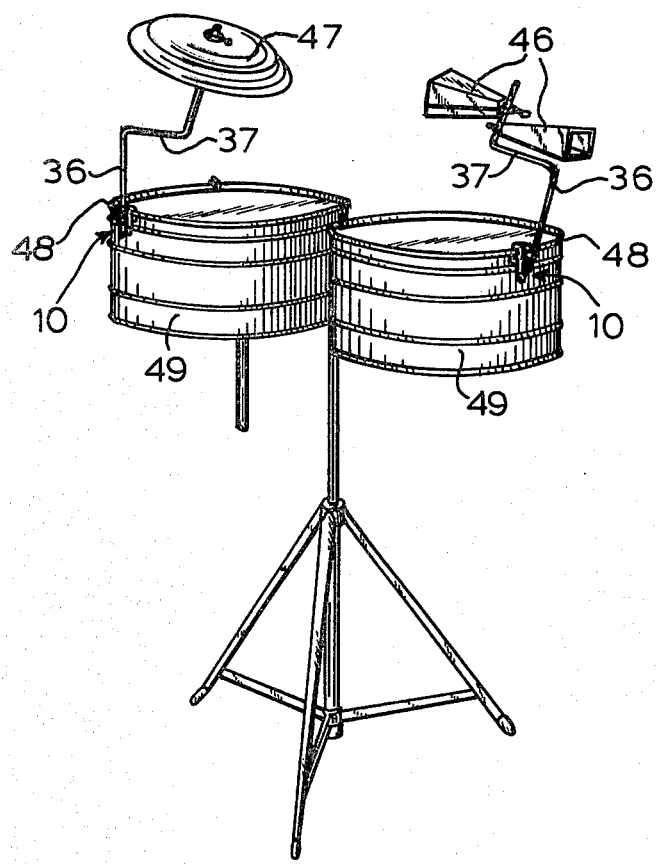
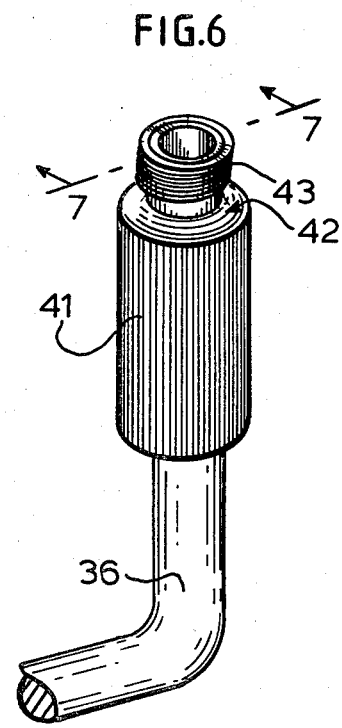
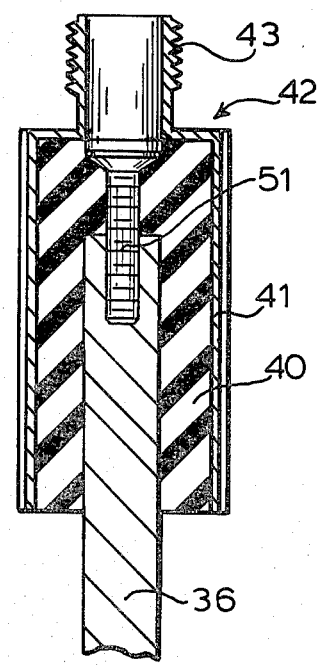
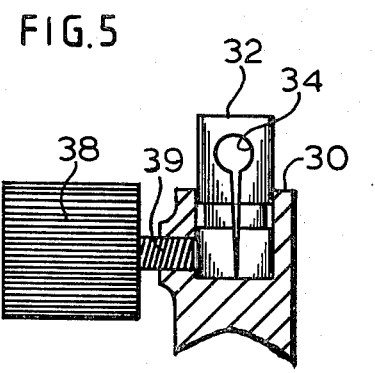

INSTRUMENT ACCESSORY CLAMPING DEVICE

The present invention relates to a clamping device. More particularly, it relates to a means for attaching microphones and percussion accessories to all types of drums.

Various types of clamps and holders have been used to attach microphones and percussion accessories (i.e., cymbals, cowbells, etc.) to the rims of drums. While generally satisfactory, they each have been found to have certain drawbacks. For example, microphone holders are known which attach directly to the rim of the drum but which do not allow for varying the position of the microphone or the accessory relative to the drum. In addition, others require special tools for effecting mounting and adjustment. Moreover, certain other clamps do not sufficiently isolate the accessory from the vibrations caused by playing the drum. Furthermore, others are rather complicated in construction and cumbersome to use.

It is therefore an object of the present invention to provide a novel clamping device for attaching microphones and other percussion accessories to the rim of a drum.

It is also an object of the present invention to provide such a novel clamping device which may be mounted quickly and without the use of any additional tools.

It is a further object of the present invention to provide such a novel clamping device which allows the instrument accessory to be easily moved to various positions, relative to the drum on which it is mounted, to accommodate the preferences and needs of the user.

It is a further object of the present invention to provide such a novel clamping device having the foregoing attributes and characteristics which is simple in construction, easy to use, and economical to fabricate.

Certain of the foregoing and related objects are readily attained in a clamping device for releasably mounting an instrument accessory which includes a clamp member having an elongated channel formed therein, a worm shaft rotatably retained in the channel, means for rotating the worm shaft, a movable clamping jaw received on the shaft for reciprocable movement along the channel upon rotation of the shaft, and a fixed clamping jaw disposed adjacent to one end of the channel for cooperation with the movable clamping jaw. A support arm for supporting an instrument accessory and means for mounting the support arm on the clamp member in a substantially universally-adjustable manner are also provided.

Preferably, the means for rotating the worm shaft comprises a control knob mounted exteriorly of the clamp member and fixed to an end of the worm shaft. Most desirably, the clamp member has a generally rectangular portion having a longitudinal side in which the channel is formed. The fixed clamping jaw projects outwardly from this longitudinal side and the jaws have opposing generally C-shaped clamping surfaces.

In a preferred embodiment of the invention, the means for mounting the support arm comprises a split collar rotatably mounted on the clamp member and having a bore formed therethrough in which the arm is receivable, and means for tightening and loosening the collar to fix or release the rotatable position thereof and to secure or release the support arm received therein, respectively. The clamp member is advantageously provided with a collar-receiving bore in which the split collar is at least partially received and a threaded bore which intersects the collar bore and the means for tightening and loosening preferably comprises a rotatable control knob having a threaded stem received in the threaded bore for engaging the collar.

In a particularly preferred embodiment of the invention, the support arm has an offset central portion and means for securing an instrument accessory to one end of the support arm are provided. The means for securing desirably comprise a vibration-damping collar secured to one end of the mounting arm and an accessory support member having a sleeve portion which is mounted in a friction-fit manner on the vibration-damping collar, which is preferably made of a rubber-like elastic material.

Other objects and features of the present invention will become apparent from the following detailed description when taken in connection with the accompanying drawings which disclose one embodiment of the invention. It is to be understood that the drawings are designed for the purpose of illustration only and are not intended as a definition of the limits of the invention.

In the drawings, wherein similar reference characters denote similar elements throughout the several views:

FIG. 1 is a perspective view of a clamping device embodying the present invention mounted on the rim of a drum and showing the same supporting a microphone;

FIG. 2 is an enlarged, fragmentarily-illustrated right-side and rear perspective view of the clamping device;

FIG. 3 is a cross-sectional side view taken along line 3—3 of FIG. 2;

FIG. 4 is a left-side and rear perspective view of the clamping device;

FIG. 5 is a fragmentarily-illustrated sectional side view taken along line 5—5 of FIG. 2;

FIG. 6 is a fragmentarily-illustrated perspective view of the end of the support arm of the clamping device;

FIG. 7 is a cross-sectional view taken along line 7—7 of FIG. 6; and

FIG. 8 is a perspective view showing the clamping device being used to mount cymbals and cowbells on a pair of drums supported, in turn, by a drum stand.

Turning now in detail to the drawings and, in particular, to FIGS. 1-5 thereof, therein illustrated is a novel clamping device embodying the present invention which includes a clamp member or housing 10 which has an inverted generally J-shaped profile defined in part by a generally rectangular shank portion 12 having a front longitudinal side 14 in which a generally U-shaped channel 16 is formed (see FIG. 3). At the ends of channel 16, a pair of opposing axial bores 18, 18' are provided for the rotational receipt therein of a threaded worm shaft 20. The upper smooth end 21 of shaft 20 is received in bore 18 and, in the area of the lower axial bore 18', worm shaft 20 is provided with a circumferentially-extending annular channel which defines a shaft section 22 of reduced cross section. A pin 24 is frictionally inserted in a bore extending from front side 14 into axial bore 18', so as to engage within the channel of shaft section 22 and thereby retain the worm shaft 20 in channel 16 in a freely rotatable manner. The lower end 23 of worm shaft 20 projects outwardly beyond the lower end of clamp member 10 and a knurled, cylindrical control knob 25 is mounted on the end thereof and is fixed thereto by means of a pin 17.

A generally L-shaped movable jaw 26 is received on worm shaft 20 via a threaded bore 27 provided in the inner arm thereof for reciprocable linear movement in channel 16 for cooperation with a fixed jaw 28 provided on the upper end of clamping member 10. Each of the jaws 26, 28 is provided with a generally C-shaped opposing recess 29, 29', respectively, for clamping the drum rim 48 in a mating manner; of course, the profile of the same can be modified to suit the configuration of the rim or other member on which it will be mounted. By rotation of control knob 25, worm shaft 20 will be rotated and, due to the fact that the jaw 26 is threadably received thereon, the jaw 20 will move either up or down, depending on the direction of rotation of control knob 25; this being due to the fact that the movable jaw is retained within the channel and cannot rotate with the worm shaft, as a result of which the rotational movement of shaft 20 is transformed into a linear movement of movable jaw 26.

A generally rectangular raised section 30 is provided on the rear side of the clamping member 10 in which a central bore 31 is formed for receipt of a rotatable generally cylindrical and integral split collar 32 formed with a single slit. The integral split collar 32 is retained in bore 31 by means of a pin 35 which mates with a circumferentially-extending annular groove 33 provided adjacent to the inner end of split collar 32. Split collar 32 has an axial bore 34, the axis of which is disposed normally to its axis of rotation, which defines a cylindrical opening for receipt therein of a support arm 36. In order to fix the rotatable position of the integral split collar 32 and to securely clamp the support arm 36 within the cylindrical bore 34 thereof, a knurled, cylindrical control member 38 is provided having a threaded step 39 (see FIG. 5) which is received within a threaded bore formed in a side face of raised section 30 which projects into central bore 31 in which the integral split collar 32 is received. By rotating control knob 38, the threaded stem 39 thereof may be displaced towards or away from the split collar, depending on the direction of rotation, to thereby tighten or loosen the same and thereby fix or release the rotatable position of the collar and support arm 36 received therein, respectively.

As shown in FIGS. 6 and 7, the other end of support arm 36 is provided with a vibration-damping attachment. In particular, a cylindrical rubber or resilient plastic collar or plug 40 having an inverted U-shaped cross section is mounted on the end of support arm 36 by means of a screw 51. An attachment or support member 42 for the accessory item is, in turn, mounted on rubber plug 40, in a friction-fit manner, by means of an exteriorly-knurled, cylindrical sleeve portion 41. This support member 42 has an upper threaded cylindrical section 43 for attachment thereto of an accessory item, such as a microphone 45 (see FIG. 1). As a result of the fact that the accessory support member 42 is supported solely by the rubber plug 40, the vibrations caused by the playing of the musical instrument will not be transmitted by the clamping device thereto. As shown in FIG. 8, aside from microphones 45, other accessories, such as cowbells 46 and cymbals 47 may be mounted by means of the present clamping device to the rim 48 of a drum 49.

As seen in FIGS. 1 and 8, support arm 36 is provided with a central offset portion 37, so as to allow for greater adjustability as to the specific positioning of the accessory item, relative to the drum on which it is mounted (i.e., either away from or towards the same), this being effected by rotation of support arm 36 about its own axis. In addition, the adjustable rotational position of the integral split collar 32 permits rotation of clamping arm 36 about a transverse axis, relative to its axis of rotation. These two adjustment features in combination constitute, in effect, an arrestable universal joint which provides a wide range of possible positions for the clamping arm and, in turn, the accessory item to accommodate the desires of the user.

Various modifications may be made as will be apparent to those skilled in the art. For example, while the clamping device is specifically intended for mounting on drum rims, it may be modified for mounting on other instruments or instrument stands or accessories. In addition, the configuration of the clamp member, clamping jaws and clamping arm may also be modified to suit the particular application intended.

Thus, while only one embodiment of the present invention has been shown and described, it will be obvious that many changes and modifications may be made thereunto, without departing from the spirit and scope of the invention.

What is claimed is:

1. A clamping device for releasably mounting an instrument accessory, comprising:

a clamp member having an elongated channel formed therein, a worm shaft rotatably retained in said channel, means for rotating said worm shaft, a movable clamping jaw received on said shaft for reciprocal movement along said channel upon rotation of said shaft, a fixed clamping jaw disposed adjacent to one end of said channel for cooperation with said movable clamping jaw, and a receiving bore and a threaded bore intersecting said receiving bore;

a support arm for supporting an instrument accessory including a vibration-damping collar secured to one end of said support arm and an accessory support member having a knurled sleeve portion mounted in a friction-fit manner on said vibration-damping collar so that said accessory support member together with said instrument accessory may be rotated on said support arm; and means for adjustably mounting said support arm on said clamp member, including an integral split collar rotatably mounted in said receiving bore of said clamp member and having a bore formed therethrough in which said arm is rotatingly received, and a rotatable control knob having a threaded stem received in said threaded bore for engaging said collar to thereby tighten and loosen said collar to fix or release the rotatable position thereof and to secure or release said support arm received therein.

2. A clamping device for releasably mounting an instrument accessory, comprising:

a clamp member having an elongated channel formed therein, a worm shaft rotatably retained in said channel, means for rotating said worm shaft, a movable clamping jaw received on said shaft for reciprocal movement along said channel upon rotation of said shaft, and a fixed clamping jaw disposed adjacent to one end of said channel for cooperation with said movable clamping jaw;

a support arm for supporting an instrument accessory including a vibration-damping collar secured to one end of said support arm and an accessory support member having a knurled sleeve portion mounted in a friction-fit manner on said vibration-damping collar so that said accessory support member together with said instrument accessory may be rotated on said support arm; and means for adjustably mounting said support arm on said clamp member.

3. The clamping device according to claim 2, wherein said vibration-damping collar comprises a rubber-like elastic material.

4. A clamping device for releasably mounting an instrument accessory, comprising:

a clamp member having an elongated channel formed therein, a worm shaft rotatably retained in said channel, means for rotating said worm shaft, a movable clamping jaw received on said shaft for reciprocal movement along said channel upon rotation of said shaft, a fixed clamping jaw disposed adjacent to one end of said channel for cooperation with said movable clamping jaw, and a receiving bore and a threaded bore intersecting said receiving bore;

a support arm for supporting an instrument accessory; and means for adjustably mounting said support arm on said clamp member, including an integral split collar rotatably mounted in said receiving bore of said clamp member and having a bore formed therethrough in which said arm is rotatingly received, and a rotatable control knob having a threaded stem received in said threaded bore for engaging said collar to thereby tighten and loosen said collar to fix or release the rotatable position thereof and to secure or release said support arm received therein.

* * * * *